US008121662B2

(12) United States Patent
Martin et al.

(10) Patent No.: US 8,121,662 B2
(45) Date of Patent: Feb. 21, 2012

(54) VIRTUAL FM ANTENNA

(75) Inventors: Francis Rajesh Martin, Santa Clara, CA (US); Patrick Clement, Belmont (CH); Sameer Bidichandani, Los Gatos, CA (US); Frederic Castella, Lausanne (CH)

(73) Assignee: Marvell World Trade Ltd., St. Michael (BB)

( * ) Notice: Subject to any disclaimer, the term of this patent is extended or adjusted under 35 U.S.C. 154(b) by 1089 days.

(21) Appl. No.: 11/773,928

(22) Filed: Jul. 5, 2007

(65) Prior Publication Data

US 2008/0024375 A1 Jan. 31, 2008

Related U.S. Application Data

(60) Provisional application No. 60/868,233, filed on Dec. 1, 2006, provisional application No. 60/825,359, filed on Sep. 12, 2006, provisional application No. 60/823,571, filed on Aug. 25, 2006, provisional application No. 60/820,711, filed on Jul. 28, 2006.

(51) Int. Cl.
*H04M 1/00* (2006.01)

(52) U.S. Cl. ................ 455/575.6; 455/550.1; 379/430.1

(58) Field of Classification Search ............... 455/550.1, 455/575.1, 575.2, 575.6, 575.7; 379/428.01, 379/430.1
See application file for complete search history.

(56) References Cited

U.S. PATENT DOCUMENTS

| | | | | |
|---|---|---|---|---|
| 3,329,957 | A | 7/1967 | Hoynes | |
| 6,047,163 | A | 4/2000 | Miyoshi | |
| 7,038,635 | B2 * | 5/2006 | Fukushima et al. | 343/895 |
| 7,420,472 | B2 * | 9/2008 | Tran | 340/573.1 |
| 2004/0098144 | A1 * | 5/2004 | Hashimoto et al. | 700/27 |
| 2005/0227633 | A1 * | 10/2005 | Dunko | 455/90.3 |
| 2005/0264427 | A1 * | 12/2005 | Zeng et al. | 340/635 |
| 2007/0173906 | A1 * | 7/2007 | Yamazaki | 607/60 |
| 2008/0158432 | A1 * | 7/2008 | Hwang et al. | 348/725 |

FOREIGN PATENT DOCUMENTS

| | | |
|---|---|---|
| EP | 0443491 | 8/1991 |
| GB | 2365628 | 2/2002 |
| JP | 03075065 | 3/1991 |
| JP | 03192901 | 8/1991 |
| JP | 05317278 | 12/1993 |
| WO | 2006121241 | 11/2006 |

* cited by examiner

*Primary Examiner* — Nhan Le

(57) ABSTRACT

An apparatus and method for receiving wireless signals couples an antenna input of a receiver to a human body and receives a signal conducting from said body. Impedance matching circuitry lessens signal power loss at the antenna input. Parameters of the impedance matching circuitry can be adjusted based on a detected impedance, a detected signal strength, or the frequency of the signal.

16 Claims, 4 Drawing Sheets

VIRTUAL FM ANTENNA

CROSS REFERENCE TO RELATED APPLICATION

The present application claims the benefit of co-pending U.S. provisional application Ser. Nos. 60/820,711, filed on Jul. 28, 2006; 60/823,571, filed on Aug. 25, 2006; 60/825,359, filed on Sep. 12, 2006; and 60/868,233, filed on Dec. 1, 2006. The disclosures of the co-pending provisional applications are incorporated herein by reference in their entirety.

FIELD OF THE INVENTION

The present invention relates to the field of antennas and FM receivers.

BACKGROUND

The field of consumer electronics places a high value on minimizing size and improving portability, particularly in wireless communication devices. The need for an adequately long antenna, however, limits how small certain wireless devices can be. Antenna efficiency is a function of many parameters, including an antenna's length. Generally, most receivers function well enough with antennas half the wavelength or one quarter of the wavelength of the signal being received. Receivers using antennas substantially less than one quarter of the wavelength, however, will have less adequate reception.

The wavelength ($\lambda$) of a signal equals the speed of light (c) divided by the frequency (f). For example, 2.4 GHz signals, such as those used by Bluetooth devices, cordless phones, wireless routers, and other household devices have wavelengths less than 13 centimeters. FM radio signals, which range from approximately 87 MHz to 108 MHz, have wavelengths from 277 centimeters to 344 centimeters.

A $\lambda/4$ antenna for a 2.4 GHz headset only needs to be about 3 cm, compared to about 86 centimeters for a headset receiving radio waves. A high frequency device such as a wireless headset for a cell phone can, therefore, still be quite small and have an antenna capable of good reception. Receiving lower frequency signals such as radio waves on that same headset, however, would be quite challenging. Most typical handheld radios overcome these limitations by either using an extendable metal antenna or by using the radio's headphone cords as an antenna. These two solutions, however, are both less than ideal because they both greatly increase the physical size of the system.

It would be desirable to build a small device capable of receiving lower frequency signals without the need for bulky external antennas.

SUMMARY OF THE INVENTION

An aspect of the present invention calls for connecting a receiver to the human body to create a virtual antenna. Another aspect of the present invention calls for using impedance matching circuitry to minimize energy loss at the antenna/receiver interface. Another aspect of the present invention calls for using real-time impedance matching circuitry to adjust circuit parameters in accordance with changes detected in the impedance of the body.

DETAILED DESCRIPTION

Figure 1:
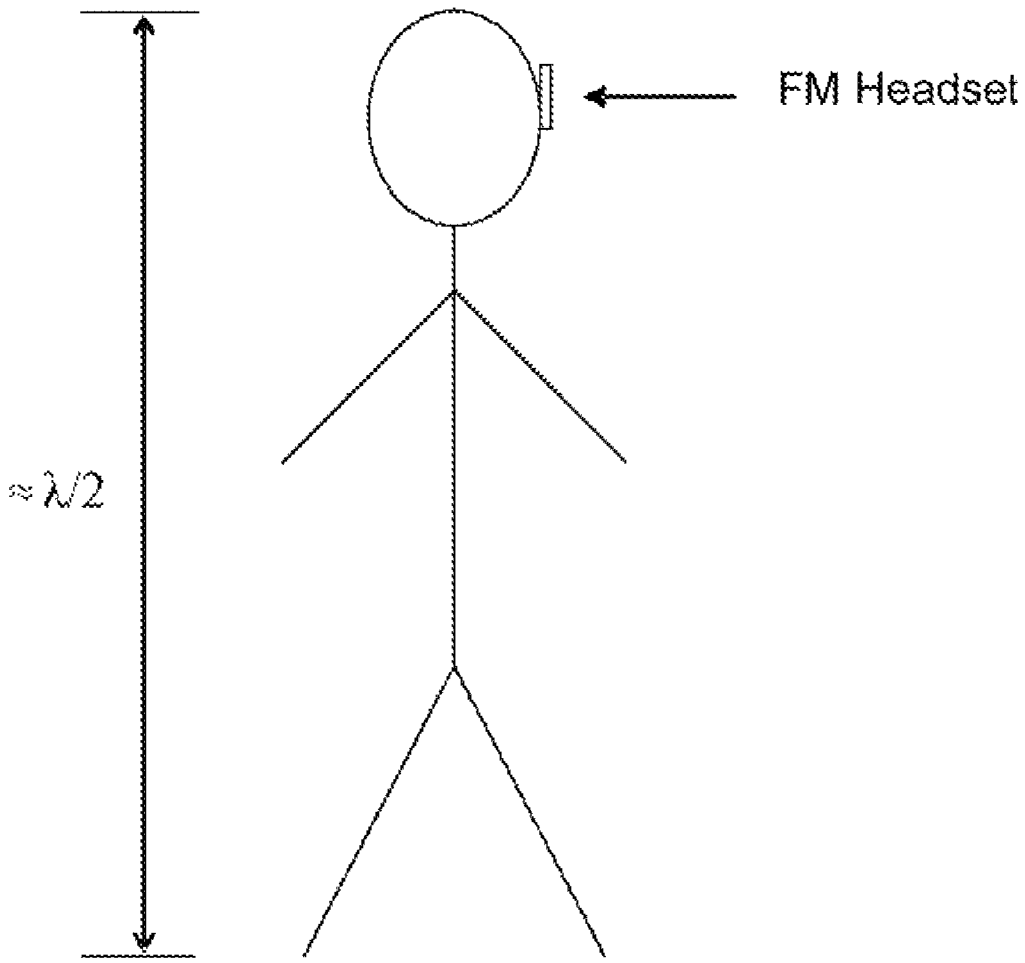
FIG. 1 shows a receiver embodying aspects of the present invention.

FIG. 1 depicts a diagram of a human body with an FM headset. An average body (~5-6 feet), is roughly half of the wavelength of an FM radio wave and has a resonant frequency around 76 to 86 MHz, both of which are desirable characteristics for an FM antenna. The body, however, is a poor conductor, and due to the small size of the FM headset, the antenna connection will have a high impedance. The present invention overcomes these deficiencies and uses the human body to aid in the reception of radio waves.

Figure 2B:
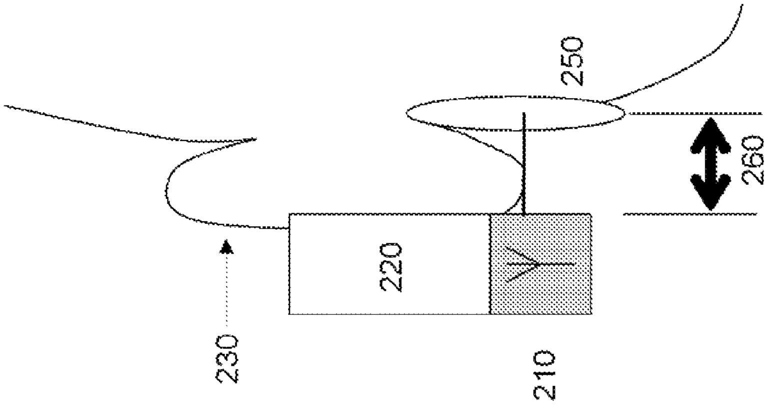
FIGS. 2*a-b* show alternate views of a headset receiver embodying aspects of the present invention.
Figure 2A:
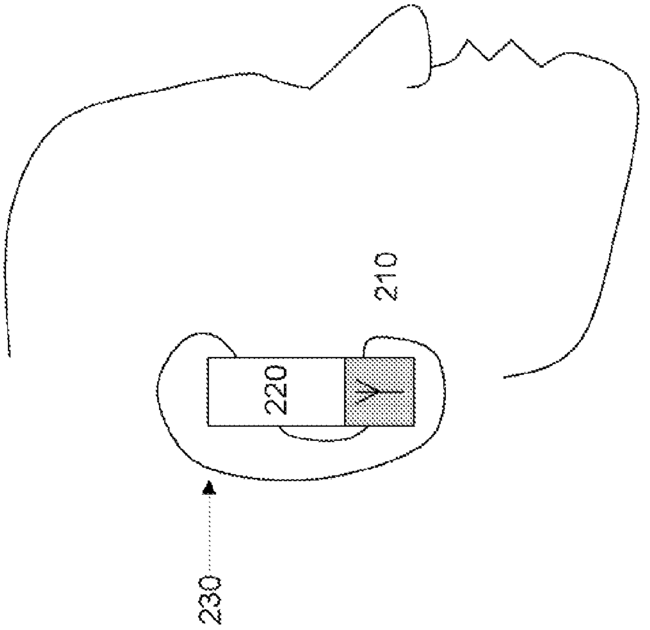

FIGS. 2*a* and 2*b* show a headset device 220 containing a receiver 210 embodying aspects of the present invention. The device 220 is configured to be worn on the ear 230. Although this particular embodiment shows a headset 220, the same concepts can be applied to devices connected to the wrist, ankle, waist, or any other part of the human body. A receiver 210 inside the device 220 can have an antenna input which can be connected to a conductive, external part of the device 220 that touches the body. This connection can be achieved by enclosing the device 220 in a conductive casing, covering the outside of the device 220 with a metallic paint, or by using a conductive contact pad 250 to touch the body. Rather than having a conductive material directly contact the skin, the device can also be capacitively coupled to the skin by having a conductive surface separated from the skin by a layer of plastic or coating of paint. A contact pad 250 can allow the device designer, for example, to build a device 220 to be worn on the ear but where the contact point with the body is on the cheek or neck. The contact pad can be separated by a distance 260 from the receiver 210. The device can be configured to either have the body serve as the only antenna or to have the body extend a built-in antenna.

Typical FM receivers have impedances of 75 to 300 ohms, while the system described herein has an impedance of roughly 1000 ohms, for example. In order to minimize the energy loss at the antenna/receiver interface and maximize power transfer, an aspect of the present invention may utilize an impedance matching network, such as the LC tank circuit shown in FIG. 3 for example. The circuit of FIG. 3 contains an antenna input 310, a capacitor (C1) 320, and an inductor (L1) 330. The capacitor 320 and inductor 330 can be connected in parallel to the antenna input and a ground 340.

An LC tank circuit can form a desirable impedance matching network because it can alter the impedance of the circuit with minimal power loss compared to a resistor or other circuit elements and configurations. The LC tank circuit can also be configured to act as a filter by maximizing transmission of signals at the desired frequency and minimizing transmission of signals at other frequencies. Values for the capacitor 320 and inductor 330 may be chosen so that the resonant frequency of the LC tank circuit is the desired transmission frequency. When the resonant frequency of the LC tank circuit corresponds to the desired transmission frequency, the efficiency of power transfer from the antenna to the receiver will be maximum.

Figure 3:
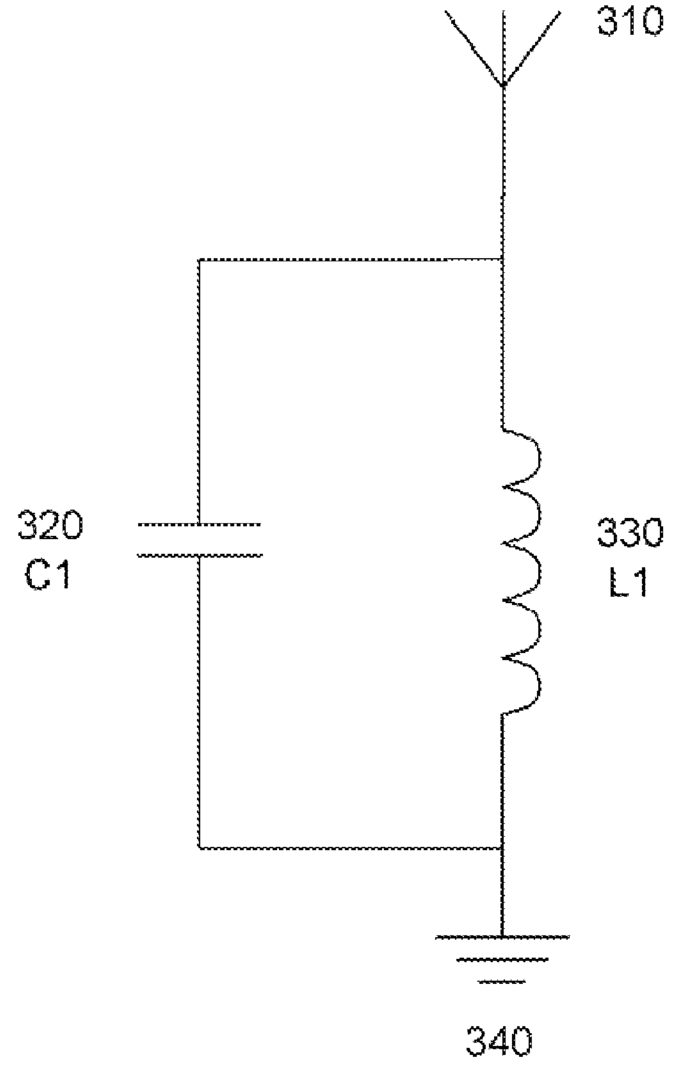
FIG. 3 shows an example of impedance matching circuitry embodying aspects of the present invention.

A device, however, may not have a specific transmission frequency and may need to cover a band of frequencies. The values of the inductors 330 and capacitors 320 can be customized to the particular needs (e.g. narrow bandwidth or broad bandwidth) of each specific device. It is appreciated that the matching network of FIG. 3 represents only one of many matching networks that can be utilized.

The antenna input 310 can be connected to the human body, and the ground 340 can be connected to the ground of a PC board. The grounding 340 and antenna input 310 can also be reversed, with the ground 340 being connected to the human body instead of the antenna input.

Figure 4:
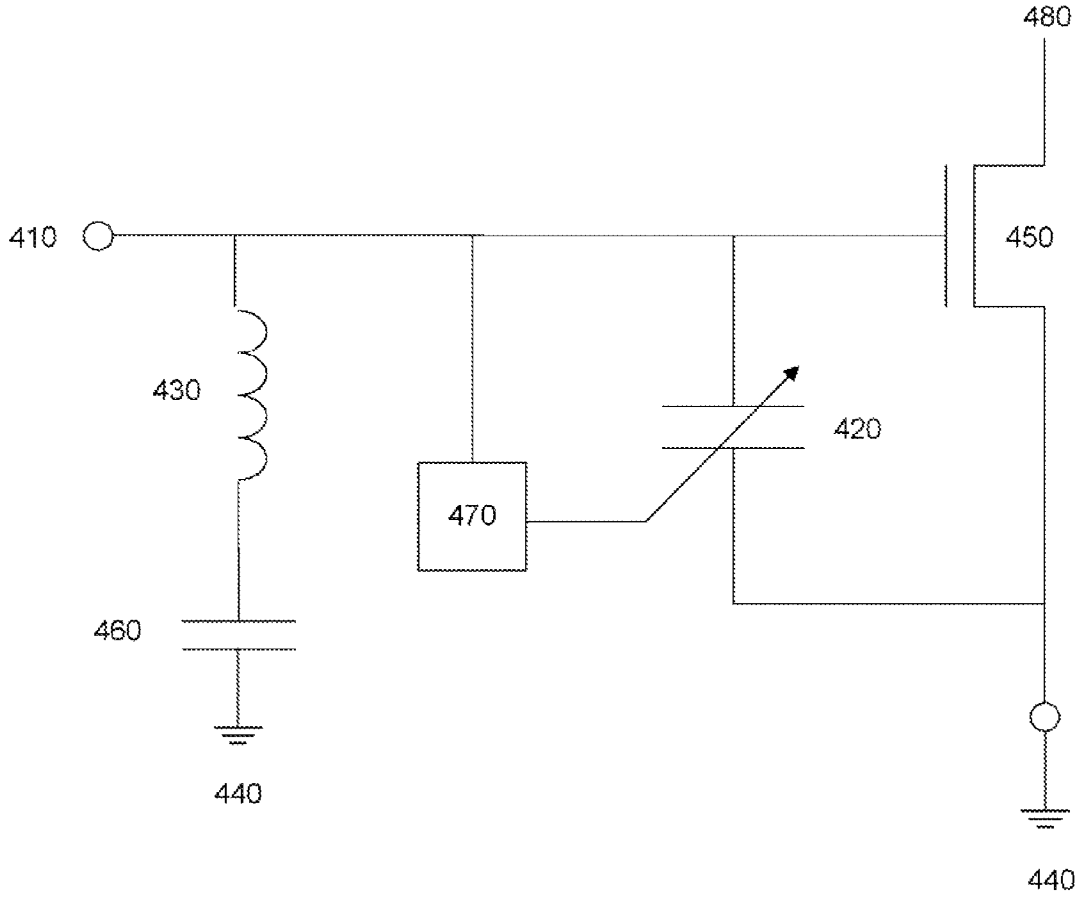
FIG. 4 shows an example of real-time impedance matching circuitry.

The impedance of the system will change depending on the frequency of the signal being transmitted, as well other factors, such as where the device is connected on the body. In order to improve performance, an aspect of the present invention calls for real-time impedance matching to optimize the received signal level. FIG. 4 shows a diagram for a matching network circuit that can dynamically adjust to the changing impedance of the system. The circuit of FIG. 4 contains an antenna input 410 and a ground 440. The antenna input 410 can be connected to the body, and the ground 440 can be connected to the ground of a PC board. Like the circuit of FIG. 3, the matching network of FIG. 4 can contain capacitors 420 and inductors 430 connected in parallel to the antenna input 410 and ground 440. An aspect of the present invention calls for the capacitor 420 to be a tunable capacitor bank that can be adjusted based on the measured impedance at the interface of the body and the antenna input 410. The inductor 430 might have a value of approximately 100 nH, and the tunable capacitor bank might, for example, be able to adjust from approximately 5 pF to 20 pF.

Digital detection circuitry 470 can detect the impedance at the interface of the body and the antenna input 410 and adjust the tunable capacitor bank accordingly. Alternatively, the digital detection circuitry 470 can adjust the tunable capacitor bank based on a detected indication of signal strength. Based on either the detected impedance or the detected signal strength, the digital detection circuitry can use a software-based algorithm for tuning the capacitor bank so that the resonant frequency of the matching network is close to or the same as the transmission frequency. Varying the resonant frequency of the matching network can allow the matching network to achieve maximum efficiency of power transfer at multiple frequencies instead of at a specific frequency. Tunability to accommodate multiple frequencies can be desirable for devices that need to cover a wide band of frequencies.

Another aspect of the present invention calls for the real-time impedance matching to be performed dynamically. The digital detection circuitry 470 can act as a feedback loop that constantly monitors and adjusts the impedance of the network, even when the frequency of the signal being received is not changing. In other embodiments, the digital detection circuitry can include a Low Noise Amplifier 450. Additionally, aspects or the entirety of the FM receiver can be combined with aspects of the digital circuitry.

The matching network of FIG. 4 can also contain a bypass capacitor 460 to block DC components of signals and a LNA 450 to amplify the received signal before sending it to a receiver. The signal can be transmitted to the receiver from the output 480 of the LNA 450. In one embodiment of the present invention, the capacitor 420 and LNA 450 can be on-chip, while the inductor 430 and bypass capacitor 460 can be off-chip. The locations of the various components on or off the chip can be altered.

Although aspects of the present invention, for ease of explanation, have been described in reference to an FM radio receiver, the scope of the present invention includes a wide range of devices which can receive a wide range of signals at different frequencies. For example, aspects of the present invention could be included in two-way radios, cell phones, household cordless phones, AM radios, non-U.S. radios which operate at different frequencies (e.g. Japan where radio signals are transmitted at 76-90 MHz), and virtually any other miniature wireless receiving device.

The previous description of embodiments is provided to enable a person skilled in the art to make and use the present invention. Various modifications to these embodiments will be readily apparent to those skilled in the art, and the generic principles and specific examples defined herein may be applied to other embodiments without the use of inventive faculty. For example, some or all of the features of the different embodiments discussed above may be deleted from the embodiment. Therefore, the present invention is not intended to be limited to the embodiments described herein but is to be accorded the widest scope defined only by the claims below and equivalents thereof.

What is claimed is:

1. An apparatus for receiving wireless telecommunication signals, the apparatus comprising:

a receiver configured to process a wireless telecommunication signal at a frequency, said receiver having an antenna input to receive said wireless telecommunication signal; and a coupling mechanism to be coupled to a human body, said coupling mechanism to receive at a first end said wireless telecommunication signal conducting through said human body and to transmit at a second end said wireless telecommunication signal to said receiver, through said antenna input for processing, wherein said coupling mechanism comprises impedance matching circuitry, and digital detection circuitry to adjust parameters of said impedance matching circuitry based on an impedance detected at the first end by said digital detection circuitry.

2. The apparatus of claim 1, wherein said parameters include capacitance.

3. The apparatus of claim 1, further comprising:

digital detection circuitry to detect signal strength, and to adjust parameters of said impedance matching circuitry based on said detected signal strength.

4. The apparatus of claim 3, wherein said parameters include capacitance.

5. The apparatus of claim 1, further comprising:

circuitry to adjust parameters of said impedance matching circuitry based on said frequency of said wireless telecommunication signal.

6. The apparatus of claim 5, wherein said parameters include capacitance.

7. The apparatus of claim 1, wherein said coupling mechanism comprises a conductive material.

8. The apparatus of claim 1, wherein said coupling mechanism comprises a non-conductive material and is to be capacitively coupled to said human body.

9. An apparatus for receiving wireless telecommunication signals, the apparatus comprising:

processing means for processing a wireless telecommunication signal at a frequency;

receiving means for receiving said wireless telecommunication signal, said receiving means to transmit said wireless telecommunication signal to said processing means; and coupling means for coupling said receiving means to a human body, said coupling means to receive said wireless telecommunication signal conducting through said human body and to transmit said wireless telecommunication signal to said receiving means for processing, wherein said coupling means comprises impedance matching means for lessening signal power loss as said wireless telecommunication signal is transmitted from said human body to said receiving means, detecting means for detecting impedance at said human body, and adjusting means for adjusting impedance matching means based on impedance detected by the detecting means.

10. The apparatus of claim 9, further comprising:

detection means for detecting signal strength; and, adjusting means for adjusting parameters of said impedance matching means based on a detected signal strength.

11. The apparatus of claim 9, further comprising:

adjusting means to adjust parameters of said impedance matching means based on said frequency of said wireless telecommunication signal.

12. The apparatus of claim 9, wherein said coupling means comprises a conductive material.

13. The apparatus of claim 9, wherein said coupling means comprises a non-conductive material and is to be capacitively coupled to said human body.

14. A method of receiving a wireless telecommunication signal, the method comprising:

coupling an antenna input via a coupling surface to a human body;

detecting an impedance at the coupling surface;

in response to detecting the impedance, adjusting parameters of impedance matching circuitry associated with said antenna input to lessen signal power loss;

transmitting the wireless telecommunication signal conducting through said human body via the coupling surface through said antenna input to a receiver configured to process said wireless telecommunication signal.

15. The method of claim 14, wherein said adjusting is further in response to detecting signal strength of the wireless telecommunication signal.

16. The apparatus of claim 1, wherein the wireless telecommunication signal is an FM signal.

* * * * *